United States Patent
Suzuki

(10) Patent No.: US 6,225,386 B1
(45) Date of Patent: May 1, 2001

(54) ANTISTATIC AGENT FOR SYNTHETIC POLYMER MATERIALS AND METHOD OF APPLICATION THEREOF

(75) Inventor: Masahiro Suzuki, Aichi (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 09/432,981

(22) Filed: Nov. 3, 1999

(30) Foreign Application Priority Data

Nov. 12, 1998 (JP) .................................................. 10-321176
Oct. 8, 1999 (JP) .................................................. 11-287470

(51) Int. Cl.[7] .......................... C08K 5/50; D06M 15/227; C09K 3/16

(52) U.S. Cl. .......................... 524/154; 252/8.84; 524/157; 524/158; 524/911; 524/912

(58) Field of Search .................................... 524/911, 912, 524/157, 158, 154; 252/8.84

(56) References Cited

U.S. PATENT DOCUMENTS

| | | | | |
|---|---|---|---|---|
| 3,177,174 | * | 4/1965 | Tirpak | 524/910 |
| 3,479,308 | * | 11/1969 | Gattenby et al. | 524/910 |
| 4,038,258 | * | 7/1977 | Singh et al. | 524/910 |
| 4,274,986 | * | 6/1981 | Ikenaga et al. | 528/230 |
| 4,450,249 | * | 5/1984 | Schmidt et al. | 524/912 |
| 4,873,277 | * | 10/1989 | Boutni | 524/165 |
| 4,898,771 | * | 2/1990 | Havens | 524/910 |
| 4,943,380 | * | 7/1990 | Sugiura et al. | 524/912 |
| 5,037,875 | * | 8/1991 | deGaravilla | 524/910 |
| 5,494,952 | * | 2/1996 | Hirata et al. | 524/158 |
| 5,602,195 | * | 2/1997 | Kim et al. | 524/912 |

* cited by examiner

Primary Examiner—Veronica P. Hoke
(74) Attorney, Agent, or Firm—Coudert Brothers

(57) ABSTRACT

An antistatic agent having phosphonium sulfonate of a specified kind and inorganic sulfonate of a specified kind mixed at a specified ratio can provide synthetic polymer materials with a superior antistatic characteristic without adversely affecting the natural hue and transparency of the material. Aliphatic carboxylic acid ester of polyhydric alcohol may also be mixed together in the agent.

12 Claims, No Drawings

ANTISTATIC AGENT FOR SYNTHETIC POLYMER MATERIALS AND METHOD OF APPLICATION THEREOF

BACKGROUND OF THE INVENTION

This invention relates to antistatic agents for synthetic polymer materials and methods of applying such an antistatic agent to a synthetic polymer material. Synthetic polymer materials are usually strongly hydrophobic and hence tend to become electrostatically charged. These characteristics are a problem in the production process of such materials as well as when the products made therefrom are actually used. This invention relates to antistatic agents with which such problem can be overcome and also to a method of applying such an agent to a synthetic polymer material.

In the past, electrically conductive agents such as carbon or electrically conductive metallic powder or surfactants used to be used as an antistatic agent against synthetic polymer materials. They are usually added to such a synthetic polymer material or applied on its surface. When such an electrically conductive agent is used, however, a significantly large quantity is usually required for obtaining any appreciable effect and the method of application was not very simple. Moreover, since transparent products of this kind were hard to obtain and these agents are rather expensive, they could be used only under limited circumstances. On the other hand, there are many kinds of surfactants and it is usually possible to select an appropriate surfactant for most situations, and many kinds have been proposed for application to synthetic polymer materials. If an anionic surfactant is used, however, its compatibility is usually not good and it may not disperse uniformly. Since it tends to decompose or deteriorate when heated and to adversely affect hue or transparency, it is considered difficult to use. Cationic surfactants having quaternary nitrogen in the molecule or ampholitic surfactants have good antistatic capabilities but their resistance against heat is poor, and hence they can be used only for a limited range of purposes. Non-ionic surfactants are superior to ionic surfactants regarding compatibility with synthetic polymer materials but not only is their antistatic capability weak but it tends to become weaker with time at normal or higher temperatures. For improving the characteristics of these surfactants, Japanese Patent Publications Tokkai 62-230835, 63-117061, 1-14267, 1-62336 and 1-92474 and U.S. Pat. No. 4,943,380 have proposed the use of phosphonium sulfonates. The kinds of phosphonium sulfonates proposed in these references, however, tend to adversely affect the natural hue or transparency of the synthetic polymer materials, and since only a limited amount of them can be used, sufficient antistatic quality cannot be obtained under a low humidity condition.

SUMMARY OF THE INVENTION

The problem, to which the present invention is addressed, is that prior art phosphonium sulfonates affect the natural hue and transparacy of synthetic polymer materials and since they cannot be used in a sufficiently large amount that their antistatic capabilities are limited under a low humidity condition although they generally have better compatibility and resistance against heat than other kinds of surfactants.

The invention is based on the inventor's discovery that the above and other problems can be successfully addressed to if use is made of a specified kind of phosphonium sulfonate and a specified kind of inorganic sulfonate are used in combination as an antistatic agent for synthetic polymer materials.

DETAILED DESCRIPTION OF THE INVENTION

This invention relates to an antistatic agent for synthetic polymer materials characterized as comprising a phosphonium sulfonate shown by Formula (1) below:

Formula (I)

and an inorganic sulfonate shown by Formula (2) below:

Formula (2)

where $A^1$ and $A^2$ are each alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms; $R^1$, $R^2$, $R^3$ and $R^4$ are each aliphatic or aromatic hydrocarbon group with 1–18 carbon atoms or hydrocarbon group substituted by hydroxyl or cyano group; $M^{n+}$ is alkali metal cation if $n=1$ and alkaline-earth metal cation if $n=2$; and $n=1$ or 2.

This invention also relates to an antistatic agent for synthetic polymer materials characterized as comprising not only a phosphonium sulfonate shown by Formula (1) given above and an inorganic sulfonate shown by Formula (2) given above, but also aliphatic carboxylic acid ester of polyhydric alcohol.

This invention further relates to a method of providing an antistatic characteristic to a synthetic polymer material by adding a phosphonium sulfonate shown by Formula (1) given above and an inorganic sulfonate shown by Formula (2) given above.

This invention still further relates to a method of providing an antistatic characteristic to a synthetic polymer material by adding not only a phosphonium sulfonate shown by Formula (1) given above and an inorganic sulfonate shown by Formula (2) given above but also aliphatic carboxylic acid ester of polyhydric alcohol.

Phosphonium sulfonate shown by Formula (1) is characterized as comprising both organic sulfonate anion and organic phosphonium cation. Examples of such organic sulfonate anion include (1) those having alkyl group with 1–36 carbon atoms such as methyl sulfonate, ethyl sulfonate, propyl sulfonate, butyl sulfonate, octyl sulfonate, dodecyl sulfonate, tetradecyl sulfonate, stearyl sulfonate, tetracosyl sulfonate and 2-ethylhexyl sulfonate, (2) those having alkenyl group with 4–24 carbon atoms such as butenyl sulfonate, octenyl sulfonate, dodecenyl sulfonate, tetradecenyl sulfonate and octadecenyl sulfonate; (3) phenyl sulfonate; (4) those having phenyl group substituted by alkyl group with 1–18 carbon atoms such as methylphenyl sulfonate, butylphenyl sulfonate, octylphenyl sulfonate, dodecylphenyl sulfonate, dibutylphenyl sulfonate and dinonylphenyl sulfonate; (5) naphthyl sulfonate; and (6) those having naphthyl group substituted by alkyl group with 1–18 carbon atoms such as diisopropyl naphthyl sulfonate and dibutylnaphthyl sulfonate. Preferable among these are those having alkyl group with 6–22 carbon atoms, those having phenyl group substitued by alkyl group with 2–12 carbon atoms and those having naphthyl group substituted by alkyl group with 2–12 carbon atoms. Dodecylbenzene sulfonate anion is particularly preferable.

Examples of organic phosphonium cation of Formula (1) include (1) those wherein $R^1$–$R^4$ in Formula (1) are each aliphatic hydrocarbon group with 1–18 carbon atoms such as tetramethyl phosphonium, tetraethyl phosphonium, tetrabutyl phosphonium, triethylmethyl phosphonium, tributylmethyl phosphonium, diethyl-dihexyl phosphonium, dioxyl-dimethyl phosphonium, trimethylbutyl phosphonium, trimethyloctyl phosphonium, trimethyl-lauryl phosphonium, trimethyl-stearyl phosphonium, triethyloctyl phosphonium and tributyloctyl phosphonium; (2) those wherein at least one of $R^1$–$R^4$ is aromatic hydrocarbon group such as tetraphenyl phosphonium, triphenyl methyl phosphonium, triphenylethyl phosphonium, triphenylbenzyl phosphonium and tributylbenzyl phosphonium; and (3) those wherein at least one of $R^1$–$R^4$ is hydrocarbon group substituted by hydroxyl group or cyano group such as tetramethylol phosphonium, tri (2-cyanoethyl) methyl phosphonium, tri (2-cyanoethyl) benzyl phosphonium, tri (3-hydroxypropyl) methyl phosphonium, tri (3-hydroxypropyl) benzyl phosphonium, trimethyl (2-hydroxyethyl) phosphonium and tri (2-hydroxyethyl) methyl phosphonium. Preferable among these are organic phosphonium cations wherein $R^1$–$R^4$ in Formula (1) are each aliphatic hydrocarbon group with 1–8 carbon atoms. Tetrabutyl phosphonium cation is particularly preferred.

The invention does not impose any particular limitation on the combination of organic sulfonate anion and organic phosphonium cation. These phosphonium sulfonates can be obtained by mixing corresponding metallic or ammonium salt of the organic sulfonate and quaternary phosphonium salt inside a solvent and separating the by-product inorganic salt by rinsing or extracting the phosphonium sulfonate by using an organic solvent such as methanol, isopropanol or acetone.

The inorganic sulfonates shown by Formula (2) are metallic salts obtained by using the same organic sulfonate anion described above regarding phosphonium sulfonates shown by Formula (1). Preferred alkali metallic salts include salts of sodium and potassium. Preferred alkaline-earth metallic salts include salts of calcium and magnesium.

Examples of aliphatic carboxylic acid ester of polyhydric alcohol which may be used according to this invention together with phosphonium sulfonate shown by Formula (1) and inorganic sulfonate shown by Formula (2) include ethylene glycol, propylene glycol, glycerol, polyglycerols having degree of polymerization 2–10 such as diglycerol and triglycerol, alkylene oxide adducts of these polyglycerols, and monoesters, diesters and triesters of polyhydric (dihydric - pentahydric) alcohol such as trimethylol propane and pentaerythritol and aliphatic carboxylic acid with 8–24 carbon atoms such as octaic acid, lauric acid, stearic acid and behenic acid. Preferable among them are esters of glycerol, polyglycerol with degree of polymerization 2–10, trimethylolpropane or pentaerythritol with an aliphatic carboxylic acid. Glycerol monostearate, diglycerol monostearate and pentaerythritol distearate are particularly preferred.

The antistatic agents of this invention are not limited by the method of their production. Examples of production method include: (1) the method of separately synthesizing a phosphonium sulfonate shown by Formula (1) and an inorganic sulfonate shown by Formula (2) and then mixing them together; (2) the method of preparing a mixture of a phosphonium sulfonate shown by Formula (1) and an inorganic sulfonate shown by Formula (2) by reacting respectively corresponding inorganic sulfonate and phosphonium halide at a molar ratio ((sulfonate)/(halide)) greater than 1; (3) the method of preparing a mixture of a phosphonium sulfonate shown by Formula (1) and an inorganic sulfonate shown by Formula (2) by a neutralization reaction in which an alkali compound such as alkali metal oxide, alkali metal carbonate, alkali metal hydrogencarbonate, alkaline-earth metal oxide, alkaline-earth metal carbonate or alkaline-earth hydrogencarbonate and a corresponding phosphonium hydroxide together with a corresponding organic sulfonic acid; and (4) the method of further mixing aliphatic carboxylic acid ester of polyhydric alcohol to the mixture obtained in (1)–(3).

As stated above, antistatic agents of this invention include both those with two components consisting of phosphonium sulfonate shown by Formula (1) and inorganic sulfonate shown by Formula (2) and those with three components further including aliphatic carboxylic acid ester of polyhydric alcohol. The invention does not impose any stringent limitation on the ratio of mixture for either type but the weight ratio between the phosphonium sulfonate of Formula (1) and the inorganic sulfonate of Formula (2) is preferably 99/1–5/95. Ratios in the range of 98/2–20/80 are more preferable and those in the range of 95/5–25/75 are even more preferable. As for the weight ratio between the sum of the phosphonium sulfonate of Formula (1) and the inorganic sulfonate of Formula (2) with respect to the aliphatic carboxylic acid ester of polyhydric alcohol, those in the range of 95/5–10/90 are preferable, those in the range of 80/20–20/80 are more preferable and those in the range of 70/30–30/70 are even more preferable. With the mixing ratio within such a range, antistatic agents of this invention can demonstrate their antistatic characteristics more prominently.

Methods according to this invention of applying an antistatic agent to a synthetic polymer material are categorized into (1) methods of adding any of those agents described above with two components and (2) method of adding any of those agents described above with three components. Methods of this invention are not stringently limited as to the ratio by which these two or three components are added, but the preferred ratios are as explained above. Thus, it is preferable to add phosphonium sulfonate of Formula (1) and inorganic sulfonate of Formula (2) at a weight ratio in the range of 99/1–5/95, more preferably in the range of 98/2–20/80 and even more preferably in the range of 95/5–25/75. When all three components are added, the weight ratio between the sum of phosphonium sulfonate of Formula (1) and inorganic sulfonate of Formula (2) to aliphatic carboxylic acid ester of polyhydric alcohol is preferably in the range of 95/5–10/90, more preferably in the range of 80/20–20/80, and even more preferably in the range of 70/30–30/70. By a method of application according to this invention as limited above, it is possible to provide a superior antistatic characteristic to a synthetic polymer material.

The invention does not impose any particular limitation on the method of applying or adding components of an antistatic agent to a synthetic polymer material. Examples of the method include (1) those wherein the two or three components of an antistatic agent according to this invention are preliminarily mixed together to form a mixture and this mixture is added to the synthetic polymer material; and (2) those wherein these two or three components are separately added to the synthetic polymer material. In the latter case, the order of addition is not important.

Examples of method for adding each component of an antistatic agent of this invention to a synthetic polymer material include (1) those of adding these components during the polymerization process for producing the synthetic polymer material; and (2) those of adding them during the molding of the synthetic polymer material.

Neither does this invention impose any particular limitation as to the amount of each component of an antistatic agent of this invention to be added to a synthetic polymer material. It is generally preferable, however, that the total amount of the components to be added will be 0.1–10 weight parts, and more preferably 0.2–4 weight parts, to 100 weight parts of the synthetic polymer material.

Examples of synthetic polymer materials to which antistatic agents of this invention can be effectively applied include (1) polyolefin resins such as polyethylene resins and polypropylene resins; (2) polycarbonate resins; (3) polyester resins such as polyethylene terephthalate and polybutylene terephthalate; (4) polymethyl methacrylate resins; and (5) polycaprolactam resins. The effects are particularly prominent when applied to polycarbonate resins, polyester resins and polymethyl methacrylate resins, and even more particularly prominent when applied to polycarbonate resins.

When a method of providing antistatic characteristic is used for polycarbonate resin, it is preferable to apply 0.5–2.0 weight parts of phosphonium sulfonate of Formula (1) to 100 weight parts of the resin, 0.02–0.1 weight part of inorganic sulfonate of Formula (2) and further 0.1–2 weight part of aliphatic carboxylic acid ester of polyhydric alcohol. In this manner, antistatic property can be provided to polycarbonate resins even under a low humidity condition without adversely affecting the naturally transparent characteristic of polycarbonate resin.

Antistatic agents of this invention may be applied within the framework of this invention together with agents of other kinds such as lubricants, antioxidants and ultraviolet light absorbers.

The invention is described next in terms of ten particular embodiments of antistatic agents and three particular embodiments of method of application.

EMBODIMENT 1

Antistatic agent with tetrabutyl phosphonium octyl sulfonate and sodium dodecylphenyl sulfonate at weight ratio of 90/10.

EMBODIMENT 2

Antistatic agent with tetrabutyl phosphonium stearyl sulfonate and sodium dedecylphenyl sulfonate at weight ratio of 95/5.

EMBODIMENT 3

Antistatic agent with tetrabutyl phosphonium dodecylphenyl sulfonate and potassium dedecylphenyl sulfonate at weight ratio of 93/7.

EMBODIMENT 4

Antistatic agent with diethyl-dihexyl phosphonium diisopropyl-naphthyl sulfonate and sodium diisopropyl-naphthyl sulfonate at weight ratio of 95/5.

EMBODIMENT 5

Antistatic agent with (1) tetrabutyl phosphonium dodecylphenyl sulfonate, (2) potassium dodecylphenyl sulfonate and (3) diglycerol monostearate at weight ratio (1)/(2)=93/7 and ((1)+(2))/(3)=50/50.

EMBODIMENT 6

Antistatic agent with tetrabutyl phosphonium octyl sulfonate and magnesium dedecylphenyl sulfonate at weight ratio of 90/10.

EMBODIMENT 7

Antistatic agent with tetrabutyl phosphonium lauryl sulfonate and calcium dedecylphenyl sulfonate at weight ratio of 95/5.

EMBODIMENT 8

Antistatic agent with tetrabutyl phosphonium dodecylphenyl sulfonate and magnesium dedecylphenyl sulfonate at weight ratio of 90/10.

EMBODIMENT 9

Antistatic agent with diethyl-dihexyl phosphonium diisopropyl-naphthyl sulfonate and magnesium diisopropyl-naphthyl sulfonate at weight ratio of 92/8.

EMBODIMENT 10

Antistatic agent with (1) tetrabutyl phosphonium dodecylphenyl sulfonate, (2) magnesium dedecylphenyl sulfonate and (3) diglycerol monostearate at weight ratio (1)/(2)=90/10 and ((1)+(2))/(3)=50/50.

The three particular embodiments of method of application are as follows:

EMBODIMENT 11

Method of applying each component of the antistatic agents of Embodiments 1–10 at weight ratio of 2 weight parts of their sum to 100 weight parts of polycarbonate resin.

EMBODIMENT 12

Method of applying each component of the antistatic agents of Embodiments 1–10 at weight ratio of 1 weight part of their sum to 100 weight parts of polyethylene terephthalate resin.

EMBODIMENT 13

Method of applying each component of the antistatic agents of Embodiments 1–10 at weight ratio of 3.5 weight parts of their sum to 100 weight parts of polymethyl methacrylate resin.

Next, the invention will be described by way of test examples but it goes without saying that these examples are not intended to limit the scope of the invention. In what follows, "parts" will mean "weight parts" and "%" will mean "weight %".

Part 1: Preparation of components of antistatic agents

Preparation of phosphonium sulfonates shown by Formula (1)

Dioctyl-dimethyl phophonium chloride (323 parts=1.0 mole) was mixed to sodium cetyl sulfonate (328 parts=1.0 mole) in a solvent. After sodium chloride thus produced was removed by washing with water, the solvent was distilled away to obtain dioctyl-dimethyl phosphonium cetyl sulfonate (563 parts=0.95 moles). This will be referred to as antistatic component (Q-1). Components (Q-2)–(Q-7) as summarized in Table 1 were similarly obtained.

TABLE 1

Phosphonium sulfates shown by Formula (1)

|  | A¹ (group) | R¹ (group) | R² (group) | R³ (group) | R⁴ (group) |
|---|---|---|---|---|---|
| Q-1 | cetyl | octyl | octyl | methyl | methyl |
| Q-2 | docosanyl | butyl | butyl | butyl | butyl |
| Q-3 | hexenyl | hydroxy-ethyl | hydroxy-ethyl | hydroxy-ethyl | methyl |
| Q-4 | phenyl | phenyl | phenyl | phenyl | methyl |
| Q-5 | dodecyl-phenyl | butyl | butyl | butyl | butyl |
| Q-6 | naphthyl | cyano-ethyl | cyano-ethyl | cyano-ethyl | methyl |
| Q-7 | diisopropyl-naphthyl | octyl | octyl | octyl | methyl |

Preparation of inorganic sulfonates shown by Formula (2)

Sodium lauryl sulfonate (270 parts 0.99 moles) was obtained by neutralizing lauryl sulfonic acid (250 parts=1.0 mole) with sodium hydroxide (40 parts=1.0 mole) in a usual manner. This will be referred to as antistatic component (N-1). Components (N-2)–(N-6) as summarized in Table 2 were similarly obtained.

Calcium lauryl sulfonate (533 parts=0.99 moles) was obtained by neutralizing lauryl sulfonic acid (500 parts=2.0 moles) with calcium hydroxide (74 parts=1.0 mole) in a usual manner. This will be referred to as antistatic component (N-7). Components (N-8)–(N-12) as also summarized in Table 2 were similarly obtained.

TABLE 2

Inorganic sulfonates shown by Formula (2)

|  | A² (group) | $M^{n+}$ |
|---|---|---|
| N-1 | lauryl | $Na^+$ |
| N-2 | octadecenyl | $K^+$ |
| N-3 | phenyl | $Na^+$ |
| N-4 | dodecylphenyl | $Na^+$ |
| N-5 | naphthyl | $K^+$ |
| N-6 | diisopropyl naphthyl | $Na^+$ |
| N-7 | lauryl | $Ca^{++}$ |
| N-8 | octadecenyl | $Mg^{++}$ |
| N-9 | phenyl | $Ca^{++}$ |
| N-10 | dodecylphenyl | $Mg^{++}$ |
| N-11 | naphthyl | $Ca^{++}$ |
| N-12 | diisopropyl naphthyl | $Mg^{++}$ |

Part 2: Preparation of antistatic agents

Antistatic agent (P-1) (100 parts) was prepared by mixing dioctyl-dimethyl phosphonium propyl sulfonate (99 parts) and sodium dodecylphenyl sulfonate (1 part). Antistatic agents (P-2)–(P-4), (P-8) and (P-14)–(P-23) were similarly prepared as summarized in Tables 3 and 4.

Antistatic agent (P-5) (187 parts) was prepared by mixing component (N-2) (189 parts=0.51 moles) obtained in Part 1 and triphenylmethyl phosphonium chloride (16 parts=0.05 moles) according to the method described in Japanese Patent Publication Tokkai 2-188593 and removing sodium chloride which was produced. Antistatic agents (P-6) and (P-7) were similarly prepared as summarized also in Table 3.

Antistatic agent (P-9) (182 parts) was prepared by mixing naphthyl sulfonic acid (155 parts=0.72 moles), sodium carbonate (30 parts=0.28 moles) and tricyanoethylmethyl phosphonium hydroxide (34 parts=0.15 moles) to neutralize according to the method described in Japanese Patent Publication Tokko 47-2234. Antistatic agent (P-10) was similarly prepared as summarized also in Table 3.

Antistatic agent (P-11) (30 parts) was prepared by mixing 20 parts of (P-3) and 10 parts of glycerol monostearate.

Antistatic agent (P-12) (20 parts) was prepared by mixing 10 parts of (P-7) and 10 parts of diglycerol monostearate.

Antistatic agent (P-13) (30 parts) was prepared by mixing 10 parts of (P-10) and 20 parts of pentaerythritol distearate.

Antistatic agent (P-24) (30 parts) was prepared by mixing 20 parts of (P-16) and 10 parts of glycerol monostearate.

Antistatic agent (P-25) (20 parts) was prepared by mixing 10 parts of (P-20) and 10 parts of diglycerol monostearate.

Antistatic agent (P-26) (30 parts) was prepared by mixing 10 parts of (P-23) and 20 parts of pentaerythritol distearate.

TABLE 3

|  | Phosphonium sulfonate (Q) shown by Formula (1) | | | | | Inorganic sulfonate (N) shown by Formula (2) | | Weight ratio (Q)/(N) |
|---|---|---|---|---|---|---|---|---|
|  | A¹ | R¹ | R² | R³ | R⁴ | A² | $M^{1+}$ | |
| P-1 | PP | OC | OC | MT | MT | DCP | $Na^+$ | 99/1 |
| P-2 | OC | BT | BT | BT | BT | DCP | $Na^+$ | 90/10 |
| P-3 | ST | BT | BT | BT | BT | DCP | $Na^+$ | 95/5 |
| P-4 | DO | BT | BT | BT | BT | OC | $K^+$ | 90/10 |
| P-5 | OD | PH | PH | PH | MT | OD | $K^+$ | 15/85 |
| P-6 | PH | HE | HE | HE | ET | PH | $Na^+$ | 50/50 |
| P-7 | DCP | BT | BT | BT | BT | DCP | $K^+$ | 93/7 |
| P-8 | DNP | BT | BT | BT | BT | ST | $Na^+$ | 90/10 |
| P-9 | NP | CE | CE | CE | MT | NP | $Na^+$ | 35/65 |
| P-10 | DI | ET | ET | HX | HX | DI | $Na^+$ | 95/5 |

TABLE 4

|  | Phosphonium sulfonate (Q) shown by Formula (1) | | | | | Inorganic sulfonate (N) shown by Formula (2) | | Weight ratio (Q)/(N) |
|---|---|---|---|---|---|---|---|---|
|  | A¹ | R¹ | R² | R³ | R⁴ | A² | $M^{2+}$ | |
| P-14 | PP | OC | OC | MT | MT | DCP | $Mg^{++}$ | 98/2 |
| P-15 | OC | BT | BT | BT | BT | DCP | $Mg^{++}$ | 90/10 |
| P-16 | LR | BT | BT | BT | BT | DCP | $Ca^{++}$ | 95/5 |
| P-17 | DO | BT | BT | BT | BT | OC | $Ca^{++}$ | 90/10 |
| P-18 | OD | PH | PH | PH | MT | OD | $Ca^{++}$ | 15/85 |
| P-19 | PH | HE | HE | HE | ET | PH | $Mg^{++}$ | 50/50 |
| P-20 | DCP | BT | BT | BT | BT | DCP | $Mg^{++}$ | 90/10 |
| P-21 | DNP | BT | BT | BT | BT | ST | $Ca^{++}$ | 90/10 |
| P-22 | NP | CE | CE | CE | MT | NP | $Mg^{++}$ | 35/65 |
| P-23 | DI | ET | ET | HX | HX | DI | $Mg^{++}$ | 92/8 |

In Tables 3 and 4:
PP: propyl group
OC: octyl group
ST: stearyl group
LR: lauryl group
DO: docosanyl group
OD: octadecenyl group
PH: phenyl group
DCP: dodecyl phenyl group
DNP: dinonyl phenyl group
DI: diisopropyl naphthyl group
BT: butyl group
HE: hydroxyethyl group
CE: cyanoethyl group
ET: ethyl group
HX: hexyl group
MT: methyl group
NP: naphthyl group Part 3 Effects of antistatic agents Experiment 1

Polycarbonate resin (100 parts) and antistatic agent (P-1) (1.5 parts) were placed inside a mill (Labo Plastomill (tradename), produced by Toyo Seiki, Inc.) and kneaded for 5 minutes at 280° C. to obtain a resin composition. The resin composition thus obtained was molded into sheets of thickness 2 mm. Specific surface resistance (hereafter abbreviated as "SSR") of these sheets was measured and evaluated as explained below. Their tinting strength (hereafter abbreviated as "TS") and transparency (hereafter abbreviated as "TR") were also observed and evaluated as explained below. This is referred to as Test Example 1. Similar tests were carried out with other antistatic agents embodying this invention (Test Examples 2–26) as well as individual components of these agents (Comparison Examples 1–11). The test results are summarized in Table 5.

Measurement and evaluation of specific surface resistance

After the sheets produced as above were kept for 24 hours inside an isothermal chamber at a constant humidity (20° C. at 45% RH) to adjust their moisture level, their specific surface resistance was measured by means of a super megohm meter (Type SM-8210 produced by Toa Denpa Kogyo, Inc.) under the same environmental condition according to JIS-K6911 and evaluated as follows:

AAA: Excellent (SSR being smaller than $5 \times 10^{12} \Omega$)

AA: Good (SSR being larger than $5 \times 10^{12} \Omega$ and smaller than $5 \times 10^{13} \Omega$).

A: Fair (SSR being larger than $5 \times 10^{13} \Omega$ and smaller than $5 \times 10^{14} \Omega$).

B: Poor (SSR being larger than $5 \times 10^{14} \Omega$ and smaller than $1 \times 10^{16} \Omega$).

C: Bad (SSR being larger than $1 \times 10^{16} \Omega$).

Evaluation of tinting strength (TS)

The sheets, after their specific surface resistance was measured, were observed visually and evaluated as follows:

AA: Same hue as the blanks which were produced in the same way except no antistatic agent or its component was used.

A: Slightly stronger hue than the blanks.

B: Somewhat stronger hue than the blanks.

C: Significantly stronger hue than the blanks.

Evaluation of transparency "TR"

The sheets, after their specific surface resistance was measured, were observed visually and evaluated as follows:

A: Slightly more turbid than the blanks.

B: Clearly more turbid than the blanks.

C: Significantly more turbid than the blanks.

Experiment 2

Polyethylene terephthalate resin (100 parts) and antistatic agent (P-2) (0.6 parts) were placed inside a mill (Labo Plastomill (tradename), produced by Toyo Seiki, Inc.) and kneaded for 5 minutes at 280° C. to obtain another resin composition. The resin composition thus obtained was molded into sheets of thickness 2mm by means of a hot press (produced by Toyo Seiki, Inc.) at 260° C. Specific surface resistance (SSR) and tinting strength (TS) of these sheets were also observed and evaluated as done in Experiment 1 described above. This is referred to as Test Example 27, and similar tests were carried out with other antistatic agents embodying this invention (Test Examples 28–38) as well as with their individual components (Comparison Examples 12–22). The test results are summarized in Table 6.

Experiment 3

Polymethyl methacrylate resin (100 parts) and antistatic agent (P-3) (1 part) were placed inside a mill (Labo Plastomill (tradename), produced by Toyo Seiki, Inc.) and kneaded for 5 minutes at 260° C. to obtain still another resin composition. The resin composition thus obtained was molded into sheets of thickness 2 mm by means of a hot press (produced by Toyo Seiki, Inc.) at 260° C. Specific surface resistance (SSR), tinting strength (TS) and transparency (TR) of these sheets were also observed and evaluated as in Experiment 1 described above. This is referred to as Test Example 39, and similar tests were carried out with other antistatic agents embodying this invention (Test Examples 40–46) as well as with their individual components (Comparison Examples 23–28). The test results are summarized in Table 7.

Experiment 4

Polycarbonate resin (100 parts) and antistatic agent components (Q-1) (1.9 parts) and (N- 1) (0.1 parts) were placed inside a mill (Labo Plastomill (tradename), produced by Toyo Seiki, Inc.) and kneaded for 5 minutes at 280° C. to obtain still another resin composition. Sheets were produced from this resin composition as above and their specific surface resistance (SSR), tinting strength (TS) and transparency (TR) were also observed and evaluated as in Experiment 1 described above. This is referred to as Test Example 47, and similar tests were carried out with other antistatic agent compositions embodying this invention (Test Examples 48–66). The test results are summarized in Table 8.

Experiment 5

Polymethyl methacrylate resin (100 parts) and antistatic agent components (Q-l) (1.6 parts) and (N-4) (0.4 parts) were placed inside a mill (Labo Plastomill (tradename), produced by Toyo Seiki, Inc.) and kneaded for 5 minutes at 280° C. to obtain still another resin composition. Sheets were produced from this resin composition as above and their specific surface resistance (SSR), tinting strength (TS) and transparency (TR) were also observed and evaluated as in Experiment 1 described above. This is referred to as Test Example 67, and similar tests were carried out with other antistatic agent compositions embodying this invention (Test Examples 68–74). The test results are summarized in Table 9.

Experiment 6

Polyethylene terephthalate resin (100 parts) and antistatic agent components (Q-1) (1.9 parts) and (N-1) (0.1 parts) were placed inside a mill (Labo Plastomill (tradename), produced by Toyo Seiki, Inc.) and kneaded for 5 minutes at 280° C. to obtain still another resin composition. Sheets were produced from this resin composition as above and their specific surface resistance (SSR) and tinting strength (TS) were also observed and evaluated as in Experiment 1 described above. This is referred to as Test Example 75, and similar tests were carried out with other antistatic agent compositions embodying this invention (Test Examples 76, 78 and 87–90). The test results are summarized in Table 10.

Experiment 7

Polyethylene resin (100 parts) and antistatic agent components (Q-1) (1.6 parts) and (N-4) (0.4 parts) were placed inside a mill (Labo Plastomill (tradename), produced by Toyo Seiki, Inc.) and kneaded for 5 minutes at 180° C. to obtain still another resin composition. Sheets were produced from this resin composition as above and their specific surface resistance (SSR) and tinting strength (TS) were also observed and evaluated as in Experiment 1 described above. This is referred to as Test Example 79, and similar tests were carried out with other antistatic agent compositions embodying this invention (Test Examples 80–82 and 91–94). The test results are summarized also in Table 10.

Experiment 8

Polycaprolactam resin (100 parts) and antistatic agent components (Q-1) (1.9 parts) and (N-4) (0.1 parts) were placed inside a mill (Labo Plastomill (tradename), produced by Toyo Seiki, Inc.) and kneaded for 5 minutes at 280° C. to obtain still another resin composition. Sheets were produced from this resin composition as above and their specific surface resistance (SSR) and tinting strength (TS) were also observed and evaluated as in Experiment 1 described above. This is referred to as Test Example 83, and similar tests were carried out with other antistatic agent compositions embodying this invention (Test Examples 84–86 and 95–98). The test results are summarized also in Table 10.

As can be clear from these results, this invention has the merit of providing superior antistatic property to synthetic polymer materials without adversely affecting their natural hue or transparency even under a low humidity condition.

TABLE 5

| | Antistatic agents and components | | | | Evaluations | | |
|---|---|---|---|---|---|---|---|
| | Q/N | [Q + N] | [N] | [E] | SSR | TS | TR |
| Test Examples | | | | | | | |
| 1 (P-1) | 99/1 | 1.5 | 0.015 | | A | AA | AA |
| 2 (P-2) | 90/10 | 2.0 | 0.20 | | AA | AA | A |
| 3 (P-3) | 95/5 | 2.0 | 0.10 | | AA | AA | AA |
| 4 (P-4) | 90/10 | 1.5 | 0.15 | | AA | AA | A |
| 5 (P-5) | 15/85 | 0.2 | 0.17 | | AA | AA | A |
| 6 (P-6) | 50/50 | 0.4 | 0.20 | | AA | AA | A |
| 7 (P-7) | 93/7 | 1.0 | 0.07 | | AAA | AA | AA |
| 8 (P-8) | 90/10 | 2.0 | 0.20 | | AA | AA | A |
| 9 (P-9) | 35/65 | 0.3 | 0.195 | | AA | AA | A |
| 10 (P-10) | 95/5 | 1.8 | 0.09 | | AA | AA | AA |
| 11 (P-11) | 98/2 | 2.0 | 0.04 | 1.0*1 | AAA | AA | AA |
| 12 (P-12) | 93/7 | 1.0 | 0.07 | 1.0*2 | AAA | AA | AA |
| 13 (P-13) | 95/5 | 1.0 | 0.05 | 2.0*3 | AAA | AA | AA |
| 14 (P-14) | 98/2 | 1.5 | 0.03 | | A | AA | AA |
| 15 (P-15) | 90/10 | 2.0 | 0.20 | | A | AA | A |
| 16 (P-16) | 95/5 | 2.0 | 0.10 | | AA | AA | AA |
| 17 (P-17) | 90/10 | 1.5 | 0.15 | | A | AA | AA |
| 18 (P-18) | 20/80 | 0.2 | 0.17 | | A | AA | AA |
| 19 (P-19) | 50/50 | 0.8 | 0.40 | | AA | AA | A |
| 20 (P-20) | 90/10 | 1.0 | 0.10 | | AAA | AA | AA |
| 21 (P-21) | 90/10 | 2.0 | 0.20 | | A | AA | AA |
| 22 (P-22) | 35/65 | 1.0 | 0.325 | | AA | AA | A |
| 23 (P-23) | 92/8 | 1.8 | 0.144 | | AA | AA | AA |
| 24 (P-24) | 95/5 | 2.0 | 0.10 | 1.0*1 | AAA | AA | AA |
| 25 (P-25) | 90/10 | 1.0 | 0.10 | 1.0*2 | AAA | AA | AA |
| 26 (P-26) | 92/8 | 1.0 | 0.08 | 2.0*3 | AAA | AA | AA |
| Comparison Examples | | | | | | | |
| 1 (Q-1) | 100/0 | 2.0 | 0 | | C | A | AA |
| 2 (Q-2) | 100/0 | 2.0 | 0 | | C | A | AA |
| 3 (Q-3) | 100/0 | 4.0 | 0 | | B | C | AA |
| 4 (Q-4) | 100/0 | 4.0 | 0 | | B | C | AA |
| 5 (Q-5) | 100/0 | 2.0 | 0 | | C | A | AA |
| 6 (Q-6) | 100/0 | 2.0 | 0 | | C | A | AA |
| 7 (Q-7) | 100/0 | 2.0 | 0 | | C | A | AA |
| 8 (N-1) | 0/100 | 2.0 | 2.0 | | B | B | C |
| 9 (N-2) | 0/100 | 2.0 | 2.0 | | B | B | C |
| 10 (N-7) | 0/100 | 2.0 | 2.0 | | C | C | C |
| 11 (N-10) | 0/100 | 3.0 | 3.0 | | C | B | C |

In FIG. 5 and hereafter:
Q: phosphonium sulfonate shown by Formula (1)
N: inorganic sulfonate shown by Formula (2)
Q/N: weight ratio of Q and N TABLE 5-continued

[Q + N]: total weight part of Q and N against 100 parts of resin
[N]: weight part of N against 100 parts of resin
[E]: weight part of aliphatic carboxylic acid ester of polyhydric alcohol used against 100 parts of resin
*1: glycerol monostearate
*2: diglycerol monostearate
*3: pentaerythritol distearate

TABLE 6

| | Antistatic agents and components | | Evaluations | |
|---|---|---|---|---|
| | Q/N | [Q + N] | SSR | TS |
| Test Examples | | | | |
| 27 (P-2) | 90/10 | 0.6 | AA | AA |
| 28 (P-3) | 95/5 | 1.0 | AA | AA |
| 29 (P-4) | 90/10 | 1.0 | AA | AA |
| 30 (P-7) | 93/7 | 1.0 | AAA | AA |
| 31 (P-9) | 35/65 | 2.0 | AA | AA |
| 32 (P-10) | 95/5 | 2.0 | AA | AA |
| 33 (P-15) | 90/0 | 2.0 | AA | AA |
| 34 (P-16) | 95/5 | 2.0 | AA | AA |
| 35 (P-17) | 90/0 | 1.5 | AA | AA |
| 36 (P-20) | 90/10 | 1.0 | AAA | AA |
| 37 (P-22) | 35/65 | 3.0 | AA | AA |
| 38 (P-23) | 92/8 | 1.8 | AA | AA |
| Comparison Examples | | | | |
| 12 (Q-1) | 100/0 | 2.0 | C | A |
| 13 (Q-2) | 100/0 | 2.0 | C | A |
| 14 (Q-3) | 100/0 | 2.0 | C | A |
| 15 (Q-4) | 100/0 | 2.0 | C | A |
| 16 (Q-5) | 100/0 | 2.0 | C | A |
| 17 (Q-6) | 100/0 | 2.0 | C | A |
| 18 (Q-7) | 100/0 | 4.0 | B | C |
| 19 (N-1) | 0/100 | 2.0 | B | B |
| 20 (N-2) | 0/100 | 2.0 | B | B |
| 21 (N-7) | 0/100 | 2.0 | B | B |
| 22 (N-10) | 0/100 | 2.0 | C | B |

TABLE 7

| | Antistatic agents and components | | Evaluations | | |
|---|---|---|---|---|---|
| | Q/N | [Q + N] | SSR | TS | TR |
| Test Examples | | | | | |
| 39 (P-3) | 95/5 | 1.0 | AA | AA | AA |
| 40 (P-6) | 50/50 | 2.0 | AA | AA | A |
| 41 (P-7) | 93/7 | 2.0 | AAA | AA | AA |
| 42 (P-10) | 95/5 | 2.0 | AA | AA | AA |
| 43 (P-16) | 95/5 | 1.0 | AA | AA | AA |
| 44 (P-19) | 50/50 | 4.0 | AA | AA | A |
| 45 (P-20) | 90/10 | 2.0 | AAA | AA | AA |
| 46 (P-23) | 92/8 | 2.0 | AA | AA | AA |
| Comparison Examples | | | | | |
| 23 (Q-1) | 100/0 | 2.0 | C | A | AA |
| 24 (Q-4) | 100/0 | 2.0 | C | A | AA |
| 25 (Q-5) | 100/0 | 4.0 | A | C | AA |
| 26 (Q-7) | 100/0 | 2.0 | C | A | AA |
| 27 (N-1) | 0/100 | 2.0 | B | B | C |
| 28 (N-7) | 0/100 | 2.0 | C | B | B |

TABLE 8

| | Q/N | [Q + N] | [N] | [E] | Method of mixing | SSR | TS | TR |
|---|---|---|---|---|---|---|---|---|
| Test Examples | | | | | | | | |
| 47 Q-1/N-1 | 95/5 | 2.0 | 0.10 | | a | AA | AA | AA |
| 48 Q-2/N-4 | 90/10 | 0.8 | 0.08 | | a | AA | AA | AA |
| 49 Q-3/N-2 | 35/65 | 0.3 | 0.195 | | b | AA | AA | A |
| 50 Q-4/N-3 | 50/50 | 0.4 | 0.20 | | c | AA | AA | A |
| 51 Q-5/N-4 | 95/5 | 2.0 | 0.10 | | a | AAA | AA | AA |
| 52 Q-6/N-5 | 70/30 | 0.5 | 0.15 | | c | AA | AA | A |
| 53 Q-7/N-6 | 90/10 | 1.0 | 0.10 | | b | AA | AA | AA |
| 54 Q-2/N-1 | 95/5 | 1.0 | 0.05 | 2.0*1 | a | AAA | AA | AA |
| 55 Q-5/N-4 | 95/5 | 1.5 | 0.075 | 1.0*2 | a | AAA | AA | AA |
| 56 Q-7/N-6 | 95/5 | 2.0 | 0.10 | 1.0*3 | a | AAA | AA | AA |
| 57 Q-1/N-7 | 95/5 | 2.0 | 0.10 | | a | AA | AA | AA |
| 58 Q-2/N-10 | 90/10 | 0.8 | 0.08 | | a | AA | AA | AA |
| 59 Q-3/N-8 | 35/65 | 0.3 | 0.195 | | b | A | AA | AA |
| 60 Q-4/N-9 | 50/50 | 0.8 | 0.40 | | c | AA | AA | A |
| 61 Q-5/N-10 | 90/10 | 2.0 | 0.20 | | a | AAA | AA | AA |
| 62 Q-6/N-11 | 70/30 | 1.0 | 0.30 | | c | AA | AA | A |
| 63 Q-7/N-12 | 90/10 | 1.0 | 0.10 | | b | AA | AA | AA |
| 64 Q-2/N-7 | 95/5 | 1.0 | 0.05 | 2.0*1 | a | AAA | AA | AA |
| 65 Q-5/N-10 | 95/5 | 1.5 | 0.075 | 1.0*2 | a | AAA | AA | AA |
| 66 Q-7/N-12 | 95/5 | 2.0 | 0.10 | 1.0*3 | a | AAA | AA | AA |

In FIG. 8 and hereafter:
a: Resin, phosphonium sulfonate shown by Formula (1), inorganic sulfonate shown by Formula (2) and aliphatic carboxylic acid ester of polyhydric alcohol (if used) were mixed simultaneously in a mixer and kneaded together.
b: After resin and phosphonium sulfonate shown by Formula (1) were mixed simultaneously in a mixer and kneaded together, inorganic sulfonate shown by Formula (2) was added and further kneaded together.
c: After resin and inorganic sulfonate shown by Formula (2) were mixed simultaneously in a mixer and kneaded together, phosphonium sulfonate shown by Formula (1) was added and further kneaded together.

TABLE 9

| | Q/N | [Q + N] | Method of mixing | SSR | TS | TR |
|---|---|---|---|---|---|---|
| Test Examples | | | | | | |
| 67 (Q-1/N-4) | 80/20 | 2.0 | a | AA | AA | AA |
| 68 (Q-2/N-1) | 95/5 | 2.0 | b | AA | AA | AA |
| 69 (Q-5/N-4) | 90/10 | 2.0 | c | AAA | AA | AA |
| 70 (Q-7/N-6) | 90/10 | 1.5 | c | AA | AA | AA |
| 71 (Q-1/N-10) | 80/20 | 2.0 | a | AA | AA | AA |
| 72 (Q-2/N-7) | 85/15 | 2.0 | b | AA | AA | AA |
| 73 (Q-5/N-10) | 85/15 | 2.0 | c | AAA | AA | AA |
| 74 (Q-7/N-12) | 90/10 | 1.5 | c | AA | AA | AA |

TABLE 10

| | Q/N | [Q + N] | Method of mixing | Resin type | SSR | TS |
|---|---|---|---|---|---|---|
| Test Examples | | | | | | |
| 75 Q-1/N-1 | 95/5 | 2.0 | a | PET | AA | AA |
| 76 Q-2/N-4 | 80/20 | 2.0 | a | PET | AA | AA |
| 77 Q-5/N-4 | 95/5 | 2.0 | b | PET | AAA | AA |
| 78 Q-7/N-6 | 80/20 | 2.0 | c | PET | AA | AA |
| 79 Q-1/N-4 | 80/20 | 1.0 | a | PE | AA | AA |
| 80 Q-2/N-6 | 90/10 | 1.0 | a | PE | AA | AA |
| 81 Q-5/N-4 | 95/5 | 2.0 | b | PE | AAA | AA |
| 82 Q-7/N-1 | 80/20 | 2.0 | c | PE | AA | AA |
| 83 Q-1/N-4 | 95/5 | 2.0 | a | PCL | AA | AA |
| 84 Q-2/N-1 | 80/20 | 2.0 | b | PCL | AA | AA |
| 85 Q-5/N-4 | 90/10 | 1.0 | c | PCL | AAA | AA |
| 86 Q-7/N-6 | 80/20 | 2.0 | c | PCL | AA | AA |
| 87 Q-1/N-7 | 95/5 | 2.0 | a | PET | AA | AA |
| 88 Q-2/N-10 | 80/20 | 2.0 | a | PET | AA | AA |
| 89 Q-5/N-10 | 90/10 | 2.0 | b | PET | AAA | AA |
| 90 Q-7/N-12 | 80/20 | 2.0 | c | PET | AA | AA |
| 91 Q-1/N-10 | 80/20 | 1.0 | a | PE | AA | AA |
| 92 Q-2/N-12 | 90/10 | 1.0 | a | PE | AA | AA |
| 93 Q-5/N-10 | 90/10 | 2.0 | b | PE | AAA | AA |
| 94 Q-7/N-7 | 80/20 | 2.0 | c | PE | AA | AA |
| 95 Q-1/N-10 | 95/5 | 2.0 | a | PCL | AA | AA |
| 96 Q-2/N-7 | 80/20 | 2.0 | b | PCL | AA | AA |
| 97 Q-5/N-10 | 90/10 | 1.0 | c | PCL | AAA | AA |
| 98 Q-7/N-12 | 80/20 | 2.0 | c | PCL | AA | AA |

In TABLE 10:
PET: polyethylene terephthalate resin
PE: polyethylene resin
PCL: polycaprolactam resin

What is claimed is:
1. A method of providing antistatic characteristic to a synthetic polymer material by applying antistatic agent components, said method comprising the step of providing said synthetic polymer material with phosphonium sulfonate shown by Formula (1) and inorganic sulfonate shown by Formula (2) at weight ratio of 99/1–5/95 wherein Formula

(1) is

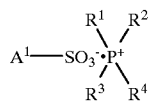

and Formula (2) is $(A^2-SO_3^-)_n \cdot M^{n+}$ where $A^1$ and $A^2$ are each alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms; $R^1$, $R^2$, $R^3$ and $R^4$ are each aliphatic or aromatic hydrocarbon group with 1–18 carbon atoms or hydrocarbon group substituted by hydroxyl or cyano group; $M^{n+}$ is alkali metal cation if n=1 and alkaline-earth metal cation if n=2; and n=1 or 2.

2. The method of claim 1 further comprising the step of providing said synthetic polymer material also with aliphatic carboxylic acid ester of polyhydric alcohol such that the weight ratio of the sum of said phosphonium sulfonate shown by Formula (1) and said inorganic sulfonate shown by Formula (2) with respect to said aliphatic carboxylic acid ester of polyhydric alcohol is 95/5–10/90.

3. The method of claim 1 wherein $A^1$ is selected from the group consisting of alkyl groups with 6–22 carbon atoms, phenyl groups substituted by alkyl group with 2–12 carbon atoms and naphthyl groups substituted by alkyl group with 2–12 carbon atoms, $R^1$, $R^2$, $R^3$ and $R^4$ are each butyl group, and $A^2$ is selected from the group consisting of alkyl groups with 6–22 carbon atoms, phenyl groups substituted by alkyl group with 2–12 carbon atoms and naphthyl groups substituted by alkyl group with 2–12 carbon atoms.

4. The method of claim 2 wherein $A^1$ is selected from the group consisting of alkyl groups with 6–22 carbon atoms, phenyl groups substituted by alkyl group with 2–12 carbon atoms and naphthyl groups substituted by alkyl group with 2–12 carbon atoms, $R^1$, $R^2$, $R^3$ and $R^4$ are each butyl group, and $A^2$ is selected from the group consisting of alkyl groups with 6–22 carbon atoms, phenyl groups substituted by alkyl group with 2–12 carbon atoms and naphthyl groups substituted by alkyl group with 2–12 carbon atoms.

5. The method of claim 1 wherein a total of 0.1–10 weight parts of said antistatic agent components is applied to 100 weight parts of said synthetic polymer material.

6. The method of claim 2 wherein a total of 0.1–10 weight parts of said antistatic agent components is applied to 100 weight parts of said synthetic polymer material.

7. The method of claim 3 wherein a total of 0.1–10 weight parts of said antistatic agent components is applied to 100 weight parts of said synthetic polymer material.

8. The method of claim 4 wherein a total of 0.1–10 weight parts of said antistatic agent components is applied to 100 weight parts of said synthetic polymer material.

9. An antistatic agent for synthetic polymer materials, said antistatic agent comprising phosphonium sulfonate shown by Formula (1) and inorganic sulfonate shown by Formula (2) at a weight ratio of 99/1–5/95 wherein Formulas (1) is

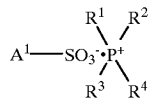

and Formula (2) is $(A^2-SO_3^-)_n \cdot M^{n+}$ where $A^1$ and $A^2$ are each alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms; $R^1$, $R^2$, $R^3$ and $R^4$ are each aliphatic or aromatic hydrocarbon group with 1–18 carbon atoms or hydrocarbon group substituted by hydroxyl or cyano group; $M^{n+}$ is alkali metal cation if n=1 and alkaline-earth metal cation if n=2; and n=1 or 2.

10. The antistatic agent of claim 9 wherein $A^1$ is selected from the group consisting of alkyl groups with 6–22 carbon atoms, phenyl groups substituted by alkyl group with 2–12 carbon atoms and naphthyl groups substituted by alkyl group with 2–12 carbon atoms, $R^1$, $R^2$, $R^3$ and $R^4$ are each butyl group, and $A^2$ is selected from the group consisting of alkyl groups with 6–22 carbon atoms, phenyl groups substituted by alkyl group with 2–12 carbon atoms and naphthyl groups substituted by alkyl group with 2–12 carbon atoms.

11. An antistatic agent for synthetic polymer materials, said antistatic agent comprising phosphonium sulfonate shown by Formula (1), inorganic sulfonate shown by Formula (2) and aliphatic carboxylic acid ester of polyhydric alcohol, wherein said phosphonium sulfonate shown by Formula (1) and said inorganic sulfonate shown by Formula (2) are contained at a weight ratio of 99/1–5/95, wherein the weight ratio of the sum of said phosphonium sulfonate shown by Formula (1) and said inorganic sulfonate shown by Formula (2) with respect to said aliphatic carboxylic acid ester of polyhydric alcohol is 95/5–10/90, wherein Formulas (1) is

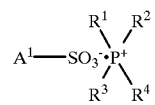

and Formula (2) is $(A^2-SO_3^-)_n \cdot M^{n+}$ where $A^1$ and $A^2$ are each alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms; $R^1$, $R^2$, $R^3$ and $R^4$ are each aliphatic or aromatic hydrocarbon group with 1–18 carbon atoms or hydrocarbon group substituted by hydroxyl or cyano group; $Mn^{n+}$ is alkali metal cation if n=1 and alkaline-earth metal cation if n=2; and n=1 or 2.

12. The antistatic agent of claim 11 wherein $A^1$ is selected from the group consisting of alkyl groups with 6–22 carbon atoms, phenyl groups substituted by alkyl group with 2–12 carbon atoms and naphthyl groups substituted by alkyl group with 2–12 carbon atoms, $R^1$, $R^2$, $R^3$ and $R^4$ are each butyl group, and $A^2$ is selected from the group consisting of alkyl groups with 6–22 carbon atoms, phenyl groups substituted by alkyl group with 2–12 carbon atoms and naphthyl groups substituted by alkyl group with 2–12 carbon atoms.

* * * * *